: 3,192,058
Patented June 29, 1965

3,192,058
REFRACTORIES AND METHODS OF MANU-
FACTURE THEREFOR
Ben Davies, Pittsburgh, and Thomas W. Smoot, Bethel Park, Pa., assignors to Harbison-Walker Refractories Company, Pittsburgh, Pa., a corporation of Pennsylvania
No Drawing. Filed May 23, 1962, Ser. No. 196,887
11 Claims. (Cl. 106—57)

This invention relates to refractories and, more particularly, to refractory shapes and methods of manufacture thereof. In a broad aspect, this invention relates to the use of an oxide of chromium as an aid in the manufacture of shaped ceramic or refractory articles. The invention further has relation to the use of a selected oxide of chromium as a forming aid in the manufacture of both fired and unfired ceramic or refractory articles.

As is well known in the refractories art, there are relatively few inorganic materials which are suitable by reason of high melting point, mineral stability and certain physical characteristics to serve as the base material for building refractory or ceramic articles. These materials, mostly oxides, may be generally categorized as basic or non-basic on the basis of their mineral forming tendencies at elevated temperatures. Thus, magnesia is a basic refractory and alumina and silica are non-basic, since the latter oxides are capable of reaction with the basic types at elevated temperatures. The chromic oxide of our invention, in addition to having unusual physical characteristics as will be developed later, is chemically compatible at high temperatures with members of both basic and non-basic aggregate types and, therefore, when used according to our teachings, has wide industrial application.

The progress of the refractory and ceramic arts has been paced to a great extent by the improvements and changes in the metallurgical industries in which the refractory or ceramic articles have particular utility. In the more contemporary metallurgical industries, increased density is one of the most important physical characteristics desirably found in refractory shapes. Refractories with high density are characteristically more dimensionally stable at high temperatures, thus providing furnace structures more able to resist modern day high temperature operations. Also, in contemporary metallurgical work with exotic metals and alloys, and in the presence of highly corrosive and chemically active slags, density is one manner of assuring resistance to penetration by the slag. There have been, of course, many suggestions by those skilled in the art as to manners in which increased density may be obtained. For example, very high forming pressures and the use of highly specialized size grading formulas have been suggested. Also, some work has been done in producing fused cast refractory mixtures, which are characterized by a glass-like or vitrified structure combining coarse crystallinity and vitreous components.

Of course, such manners of obtaining improved density require rather specialized equipment, extensive training of personnel, and are generally characterized by high capital expense, and production costs. Further, particularly in the case of the fused materials exhibiting a glass-like matrix, the increase in density is obtained with a sacrifice in thermal shock characteristics, and trueness of dimensional tolerances can only be maintained by costly cutting or grinding operations.

In other instances, the increased density is achieved only with a sacrifice in refractoriness, since fluxing agents must be incorporated in the batch to obtain densifying shrinkage characteristics.

Accordingly, it is an object of this invention to provide improved refractory shapes and methods of manufacture thereof. It is another object of this invention to provide relatively simple and comparatively inexpensive methods of fabricating improved refractory shapes of increased density, without sacrificing other desirable refractory characteristics.

It is still another object of this invention to provide formed refractory shapes made from basic or non-basic refractory compounds, or mixtures thereof, having improved density and slag-resistant characteristics. It is a further object of this invention to teach a method of utilizing a selected oxide of chromium as a densifying and pressing aid to obtain high density, slag-resistant refractory shapes.

Chrome materials are one of the many known refractory materials. In their various forms, their use in the refractory and ceramic arts has been extensively suggested. This invention deals particularly with the trivalent oxide of chrome ($Cr_2O_3$) and, in particular, to chromium sesquioxide. In the past, this compound has been used primarily as a pigment and, to some extent, as a metallurgical source of chromium metal. Special grades are also produced in limited amounts for use as a catalyst for certain chemical reactions.

Such $Cr_2O_3$ used according to the concepts of this invention, is a very finely divided powder. The separate and discrete particles of the material average about one micron or less in diameter, and are remarkably uniform in this size range. It crystallizes in the hexagonal system similar to the hematite structure. Physical form is indicated by electron microscope, and crystalinity confirmed by the existence of a definite X-ray diffraction pattern. Such $Cr_2O_3$ material is water insoluble. Widely accepted specifications for such $Cr_2O_3$ are: purity minimum 97%, water soluble impurities maximum 0.5%, volatile impurities maximum 0.5%. Specific gravity is about 5.1 to 5.2.

Briefly, according to one aspect of this invention, we teach a method of forming refractory shapes from size-graded, non-plastic, refractory aggregates such as alumina and magnesia, etc. The selected refractory aggregate may be basic or non-basic as discussed above, or mixtures thereof. The selected aggregate, however, cannot include any substantial amount of free plastic clay materials, talc, serpentine, or any of the other ceramic materials conventionally termed "plastic." By "substantial" we mean, ideally, less than about 5% by weight. By "free" plastic clay materials we mean they are present as dissociated material in the aggregate mixture. Some alumina and magnesia materials, which are particularly adapted to be selected as the aggregate of the invention, are high purity synthetic refractory materials. The magnesia and alumina materials used according to the invention are ideally high 95+% purity materials.

A more detailed understanding, other features, and further objects and advantages of the invention, will become increasingly apparent to those skilled in the refractory and ceramic arts from a study of the following detailed description.

As noted above, the water insoluble, finely divided, high purity $Cr_2O_3$ (at least 97 to 99%, by weight), which we use, has been known. Its prior uses may be generally categorized into (1) those in which the $Cr_2O_3$ was used as a major constituent of a mix, and (2) those in which it was used as a minor constituent.

$Cr_2O_3$, when used as a major constituent, has been most commonly employed to produce chromium metal upon reduction in metallo-ceramic articles for cutting tools and the like. Such articles are commonly fired in reducing atmospheres, or in the presence of carbon, to effect reduction of the $Cr_2O_3$ to a metal phase.

In the few cases where attempts have been made to use major proportions of $Cr_2O_3$ in articles which remain in the oxidized condition after firing, the articles have typically been weak and porous unless treated with low melting fluxes or fired to extremely high temperatures or handled in other unusual or costly ways. Such expensive procedures are contrary to the objects of our invention as set forth hereafter.

That class of refractories in which the $Cr_2O_3$ was a minor constituent, used it as sintering or crystallization agent in preparing sintered grain materials preliminary to the manufacture of shaped articles. During such grain preparation, chrome chemicals were typically intimately mixed with another oxide base and fired at very high temperatures, i.e., up to as high as 3250° F. and higher. Such firing destroys the individual character of the particles of the chrome chemical, converting it to mineralogical complexes with the other oxides or compounds present. One worker has suggested, under very stringently controlled process parameters, the use of $Cr_2O_3$ as a crystallization aid in forming particular types of basic refractory aggregate.

According to the present invention, the $Cr_2O_3$ must be in the physical form previously described (finely divided, high purity, substantially uniform size particles), at the time the refractory or ceramic shapes are formed. Any pre-reaction of the $Cr_2O_3$, as by reduction with carbon or combination with other refractory oxides, destroys its usefulness for our purpose. Further, because the physical effects obtained are related to the extremely fine particle size and high purity of the $Cr_2O_3$, it must be used within certain stringently controlled quantity ranges, and the aggregate with which it is used must also be controlled in particle sizing and impurities contents i.e., the mixtures must be free of plastic refractory materials and other materials which would tend to serve as fluxing agents.

For purposes of simplicity and clarity of description of the invention, the following exemplary test data is divided into two sections; namely, the basic aggregate materials and the non-basic aggregate materials.

BASIC

I. Use of $Cr_2O_3$ in a chrome ore-magnesia brick: In a laboratory study, finely divided high purity $Cr_2O_3$, of the preferred type above described, was added to a conventional 80 chrome ore/20 magnesite brick mix, in 5% increments within the range 0 to 15, by weight. The chrome ore used was a mixture of Philippine and low silica Transvaal types, size graded about −3 mesh Tyler, and the magnesia used was a dead burned synthetic type of about 98% purity and was all ball milled to about −65 mesh Tyler. As will be seen in the table below, the incorporation of the finely divided $Cr_2O_3$ reduced porosity and increased density in a resulting burned brick, in comparison with brick containing no high purity finely divided $Cr_2O_3$, when standard pressing and burning techniques were used. By standard pressing techniques we mean adding sufficient moisture as to provide a formable batch, about 4%, by weight, and applying pressures of about 8000 p.s.i. Increase of bulk density was noted in the brick after burning in a standard cone 30 burn; but more surprising, increased density was also apparent in the brick as pressed, and was greater than what might be expected from the direct substitution of $Cr_2O_3$ for lower density fines. This was determined when the test brick were weighed and measured as ejected from the forming press. The high purity finely divided $Cr_2O_3$ appeared to serve as a lubricating pressing aid in the formation of the unfired shape.

In slag test using copper converter slag at 2500° F., the improvements noted above, as a result of the addition of 5% finely divided high purity $Cr_2O_3$, were reflected in a corrosion resistance improved by a factor of 5.

Table I

| Mix number | A | B | C | D |
| --- | --- | --- | --- | --- |
| Mix (all parts by weight), percent: | | | | |
| Chromic oxide ($Cr_2O_3$) | 0 | 5 | 10 | 15 |
| Philippine chrome ore (3/6 mesh) | 30 | 30 | 30 | 30 |
| Low $SiO_2$ Transvaal chrome ore:[1] | | | | |
| −6 mesh | 41.8 | 41.8 | 41.8 | 36.8 |
| Ball mill fines | 10 | 5 | | |
| Magnesia (98% MgO on the basis of an oxide analysis), ball mill fines | 18.2 | 18.2 | 18.2 | 18.2 |
| Burn | Cone 30 | | | |
| Bulk density, p.c.f | 204 | 211 | 210 | 207 |
| Modulus of rupture, p.s.i | 1,290 | 1,320 | 1,020 | 920 |
| Apparent porosity (Av. 5), percent | 20.6 | 18.0 | 19.2 | 20.8 |
| Test with copper converter slag, erosion in milliliters [2] | 20 | 4 | 2 | 3 |

[1] $SiO_2$—less than about 3%, by weight, on the basis of an oxide analysis
[2] Copper converter slag at 2,500° F.; analysis: $SiO_2$ 24.2%, $Al_2O_3$ 4.4%, $Fe_2O$ 67.3%, CaO 0.69%, MgO 0.53%, CuO 3.5%, S 2.5%, ZnO 0.2%.

In the case of this mix, it should be noted that additions substantially in excess of 5% were decreasingly effective in some aspects. The slag resistance at 15% was still considerably better than the Mix A resistance, while the modulus of rupture was not quite as favorable as Mix A.

II. Use of $Cr_2O_3$ in a 70% magnesia–30% chrome mix: The ores were the same as discussed above under I, and were formed and fired according to similar laboratory testing techniques, except as otherwise specified.

Table II

| Mix number | E | F (with $Cr_2O_3$) |
| --- | --- | --- |
| Mix (all parts by weight), percent: | | |
| Transvaal chrome ore | 30 | 30 |
| 98% grade magensite | 70 | 67 |
| $Cr_2O_3$ | | 3 |
| Burn | 3,050° F. 10 hr. hold | |
| Bulk density, p.c.f | 188 | 197 |
| Modulus of rupture, p.s.i | 590 | 630 |
| Apparent porosity (Av. 3), percent | 19.1 | 16.4 |
| Load test, 25 p.s.i. (Av. 2), linear subsidence at 3,300° F. (no hold time), percent | 2.1 | 1.0 |
| Screen analysis (total mix), percent: | | |
| Held on— | | |
| 10 mesh | 18 | 21 |
| 28 | 20 | 18 |
| 65 | 21 | 20 |
| 150 | 12 | 12 |
| Pass−150 mesh | 29 | 29 |

Table II illustrates dramatically the reduced porosity and increased density resulting from small addition of finely divided $Cr_2O_3$.

III. The following table indicates tests on a refractory composition fabricated of 98% purity magnesia with and without minor additions of finaly divided high purity $Cr_2O_3$.

Table III

| Mix Number | G | H |
| --- | --- | --- |
| Mix (all parts by weight), percent: | | |
| 98 percent MgO[1] | 100 | 90 |
| $Cr_2O_3$ | 0 | 10 |
| Burn, cone | 30 | |
| Linear change in burning, percent | −0.2 | 0.0 |
| Bulk density, p.c.f | 179 | 188 |
| Apparent porosity, percent | 18.4 | 16.8 |
| Slag test[2] at 2,500° F. | | |
| volume corroded, ml | 17 | 6.0 |

[1] −6 mesh to ball mill fines to provide size grading substantially the same as in Table II.
[2] Copper converter slag at 2,500° F.; analysis: $SiO_2$ 24.2%, $Al_2O_3$ 4.4%, $Fe_2O_3$ 67.3%, CaO 0.69%, MgO 0.53%, CuO 3.5%, S 2.5%, ZnO 0.2%.

Additional tests were run using 97%, by weight, 98% grade magnesia and 3% of the $Cr_2O_3$ of this invention. Good density improvement was noted and some improvement in slag resistance was obtained.

NON-BASIC

I. 90% alumina and $Cr_2O_3$: In this section, the results are set forth of mixing a graded brickmaking size range 99+% purity alumina refractory with high purity finely divided silica and $Cr_2O_3$. The initial mixing, addition of tempering fluid, and forming or pressing procedures were the same as described in Part I of the Basic section above. In the following table, Mix I is a conventional mix without a $Cr_2O_3$ addition, and Mix J is the same mix with a 5% $Cr_2O_3$ addition.

Table IV

| Mix number | I | J |
|---|---|---|
| Mix (all parts by weight), percent: | | |
| Tabular alumina (99+% purity) (−6 mesh to fines) | 75 | 70 |
| Alumina (calcined 99+% purity) (−325 mesh) | 15 | 15 |
| Finely divided, high purity silica (−200 mesh) (99% pure $SiO_2$) | 10 | 10 |
| $Cr_2O_3$ | | 5 |
| Burn, °F | 2,700 | 2,700 |
| Bulk density, p.c.f. | 184 | 194 |
| Modulus of rupture, p.s.i. | 3,170 | 3,720 |
| Apparent porosity, percent | 15.8 | 12.1 |
| Permeability [1] | 0.26 | 0.19 |
| Screen analysis of mix, percent: | | |
| Held on— | | |
| 10 mesh | 14 | 17 |
| 28 | 29 | 28 |
| 65 | 14 | 14 |
| 150 | 43 | 41 |
| Pass—150 mesh | 35 | 37 |
| Slag test (blast furnace slag at 2,780° F.) volume corrosion, ml | 57 | 46 |

[1] Air flow in cubic inches/second/square inch/inch thickness/lb. air pressure.

The foregoing data table illustrates increased density, decreased porosity, and increased slag resistance for Mix J, which has the $Cr_2O_3$ addition. In pressing the unfired brick batches, I and J above, the $Cr_2O_3$ addition served as a pressing aid and lubricant for the mix, yielding a much denser and lower porosity unfired refractory body.

II. All alumina aggregates and $Cr_2O_3$: In a similar test study, using all tabular alumina aggregate (a high purity sintered synthetic alumina), finely divided high purity $Cr_2O_3$, in graded increments from 10 to 12%, was incorporated in place of a portion of the alumina fines. The graded particle sizing of the resulting mix was similar to that set forth in the table immediately above. The same mixing and forming techniques, as discussed in Part I under "Basic," were used in forming the bodies.

Table V

| Mix number | K | L | M | N | O |
|---|---|---|---|---|---|
| Mix (all parts by weight), percent: | | | | | |
| Tabular alumina: | | | | | |
| −¼ mesh | 60 | 60 | 60 | 60 | 60 |
| −48 mesh | 20 | 20 | 20 | 20 | 20 |
| −325 mesh | 20 | 17 | 14 | 11 | 8 |
| $Cr_2O_3$ | | 3 | 6 | 9 | 12 |
| CMC [1] added, parts | .5 | .5 | .5 | .5 | .5 |
| Water added | 5.4 | 5.0 | 5.0 | 4.5 | 4.0 |
| Thickness of Brick (in inches [2]) | 2.62 | 2.56 | 2.48 | 2.40 | 2.38 |
| Bulk density, p.c.f. (at press) | 197 | 202 | 209 | 215 | 217 |
| Burn | Cone 32 (3010° F., 10 hr. hold) | | | | |
| Burned bulk density, p.c.f. | 191 | 192 | 195 | 202 | 205 |

[1] CMC is carboxy methyl cellulose used as a binder to impart green strength for handling.
[2] Thickness of brick, 9×4½×2½ inches, variation after pressing from te 2½ inch dimension, constant weight of 12 pounds at press.

The decreased thickness of the 2½ inch dimension at the press, which was obtained with the increasing amounts of $Cr_2O_3$, is considered very desirable because it is another direct indication of increased density and decreased porosity. The $Cr_2O_3$ additions thus appear to act as a forming aid and lubricant.

III. In still another test, Mixes I and J of Part I above, were subjected to slip casting techniques. By slip casting techniques, we mean that 6 to 9% tempering fluid was added to the mix with a suitable dispersing agent selected from any of the many well known to those skilled in the art, such as, for example, dilute solutions of alkali metal phosphates. Normally, the mix is placed in a mold and subjected to vibration to obtain a self-sustaining body. The resulting shapes were subjected to comparative tests. The shape fabricated of Mix I had an apparent density of 165.5 p.c.f. whereas, Mix J exhibited density of 177.6. Mix I had a 9.1% moisture content, by weight, whereas with the addition of 5% finely divided, high purity $Cr_2O_3$, the moisture requirement was reduced to 7.23% moisture, by weight. The Mix J tests indicated decreased porosity and improved workability with the addition of 5% $Cr_2O_3$. Furthermore, it was easier to remove the shape from the mold. These tests also indicate the forming aid and lubricating properties of the $Cr_2O_3$ addition.

IV. Zirconia and $Cr_2O_3$: In still other tests, stabilized zirconia refractory aggregates were subjected to tests to determine the effects of the addition of small amounts of finely devided high purity $Cr_2O_3$. The following table sets forth the preferred mixes and method of manufacture.

Table VI

| Mix number | S | T | U |
|---|---|---|---|
| Mix (all parts by weight), percent: | | | |
| Calcium-stabilized $ZrO_2$: | | | |
| −4+10 mesh | 30 | 30 | 30 |
| −10+28 mesh | 35 | 35 | 35 |
| −28+65 mesh | 17 | 17 | 17 |
| −65 mesh (52% of which is less than 325 mesh) | 18 | 15 | 13 |
| $Cr_2O_3$ | | 3 | 5 |
| Tempering fluid (water [1]), percent | 2.8 | 3.1 | 3.2 |
| Forming method | Power pressed, 8,000 p.s.i., 3 seconds up and hold 3 seconds. | | |
| Burn | 2,900° F. | | |
| Roll scale slag test (typically 89 $Fe_2O_3$—on an oxide basis, 2% CaO, 9% $SiO_2$). | Specimens soaked in heat of 2,910° F. for 5 hours. | | |
| Depth of penetration (inches) | 2 | 1½ | 1¼ |
| Total volume penetration | 7/10 | 4/10 | 3/10 |

[1] The water increase was commensurate with good brickmaking pressing practices for the mixes involved.

The foregoing condensed laboratory data indicate the remarkable slag resistance of stabilized zirconia refractories, when mixed with minor quantities of $Cr_2O_3$. A comparision between standard Mix S and Mixes T and U indicates more than 50% reduction in the amount of slag which penetrated the test specimens.

One of the remarkable aspects of the zirconia-$Cr_2O_3$ mixes was the protective, apparently filming, effect afforded the stabilized zirconia grains, when mixed with the $Cr_2O_3$. Generally, chemical compounds constituting typical roll scale slag have an affinity for lime and other zirconia stabilizing materials. Lime is the stabilizing compound of most commercially used zirconia. In Mixes T and U, there was good preservation of stabilized zirconia. For example, the X-ray specimen of the standard mix, taken just under the surface of the slag bath, was approximately 65% de-stabilized; whereas, in Mix T only about 5% was de-stabilized, and in Mix U only about 4%. The significance of this is that much greater volume stability can be expected from those mixes whose mineral stability is preserved.

The foregoing discussion of actual brick manufacture and testing indicates the beneficial effects of minor additions of finely divided high purity $Cr_2O_3$ upon Basic or Non-Basic refractory aggregates, in good brickmaking graded size ranges. The $Cr_2O_3$ additions had beneficial effects in fired and unfired refractory shapes, formed by pressing, impact forming and by conventional casting operations such as slip casting. The $Cr_2O_3$ additions improved the workability of the material being handled and improved the resistance of the aggregate to slags, with which the respective aggregate materials are conventionally in contact.

The $Cr_2O_3$ addition to stabilized zirconia produced an unexpected result as compared to the other tests above discussed. It appeared to film and protect the stabilized grains, and thereby preserve mineral stability of the zirconia shapes.

As established by our laboratory testing as set forth above, the $Cr_2O_3$ additions should be maintained in the range of 1 and 15%, by weight, and preferably in the range of about 13 to 10%, by weight, with best results being obtained in the range of 5 to 3%, by weight.

It is important that the $Cr_2O_3$ addition be of high purity (preferably 99+% purity), that the separate and discrete particles thereof be substantially uniformly distributed through a mix, be maintained in such a state when added to the mixes, and be in such a state through the forming step, or the beneficial lubricating and forming aspects appear to be lessened or even destroyed. Also, as noted in the initial discussion above, clay-like materials, fluxes and binding agents which decrease refractoriness should be excluded, since they tend to destroy the beneficial aspects of the pure $Cr_2O_3$ additions.

In the foregoing discussion, all parts are by weight and all sizes are by Tyler mesh size determination unless otherwise specified.

It should be understood that the foregoing exemplary test data is presented merely to provide sufficient detail and explanation of the invention as to allow those skilled in the art to practice it, and that the true measure of the spirit and scope of the invention is to be defined by the hereafter set forth claims.

We claim:

1. A method of producing a formable refractory batch comprising, refractory brickmaking size grading, substantially nonplastic, refractory, metal oxide aggregate and mixing therewith from about 1–15%, by weight, of a water-insoluble, finely divided, high purity $Cr_2O_3$, substantially all the discrete particles of which are of substantially uniform size and averaging less than about 1 micron in diameter, and mixing the aggregate and $Cr_2O_3$ with sufficient tempering agent as to allow forming.

2. A method of forming a refractory shape comprising, refractory brickmaking size grading a substantially nonplastic, refractory, metal oxide aggregate and mixing therewith from about 1–15%, by weight, of a water-insoluble, finely divided, high purity $Cr_2O_3$ substantially all of the discrete particles of which are of substantially uniform size and averaging less than about 1 micron in diameter, mixing the aggregate and the $Cr_2O_3$ with sufficient tempering agent as to allow forming, and forming a refractory shape from the resulting mixture.

3. In stabilized zirconia refractory batches made from a mixture consisting essentially of stabilized zirconia, in a refractory brickmaking graded size range, the improvement which consists of sufficient water-insoluble, finely divided, high purity $Cr_2O_3$ to film and protect the zirconia grains, and assist in maintaining the mineral stability of said grains in a fired shape made from the batch, substantially all of the discrete particles of the $Cr_2O_3$ having an average diameter of less than about 1 micron, said particles being substantially uniformly distributed through the batch.

4. A zirconia shape resistant to high iron oxide containing slags, made from a mixture consisting essentially of, high purity, stabilized zirconia, in a graded brickmaking size range of from —4 +10 mesh to —65 mesh, the major portion of the —65 mesh zirconia being less than about 325 mesh, and from 1 to 15%, by weight, of a water-insoluble, finely divided, high purity $Cr_2O_3$, substantially all the discrete particles of which have an average diameter of less than about 1 micron.

5. A zirconia shape, according to claim 4, in which the $Cr_2O_3$ constitutes about 3 to 10%, by weight, of the mixture.

6. That method of protecting the mineral stability of stabilized zirconia refractory shapes, made from a refractory brickmaking size graded, stabilized zirconia mixture, which consists of mixing from 1 to 15%, by weight, of a water-insoluble, finely divided, high purity $Cr_2O_3$, substantially all the discrete particles of which have an average diameter of less than about 1 micron, with the size graded zirconia before forming, thoroughly blending the mixture of zirconia and $Cr_2O_3$ until the $Cr_2O_3$ particles are substantially uniformly dispersed through the mixture, forming the resulting mixture into a self-sustaining shape.

7. The method of claim 2, in which the $Cr_2O_3$ is in the range of about 3 to 10%, by weight.

8. The method of claim 2, in which the $Cr_2O_3$ is of at least 97% purity, water-soluble impurities being less than about 0.5%, by weight, volatile impurities less than about 0.5%, by weight, and the specific gravity thereof being about 5.1 to 5.2%.

9. A formed refractory shape, made from a mixture consisting essentially of, refractory brickmaking, size graded, substantially nonplastic, refractory aggregate selected from the group consisting of:
(a) chrome ore
(b) zirconia
(c) magnesia
(d) alumina, and
(e) mixtures of magnesia and chrome ore;
and from about 1 to 15%, by weight, of a water-insoluble, finely divided, high-purity $Cr_2O_3$ of at least about 97%, by weight, $Cr_2O_3$ content on an oxide basis, substantially all of the discrete particles of said high-purity $Cr_2O_3$ being of substantially uniform size and averaging less than about 1 micron in diameter, said refractory aggregate being size graded from about —3 mesh to fines.

10. A refractory batch consisting essentially of, refractory brickmaking, size graded, substantially nonplastic, refractory aggregate selected from the group consisting of:
(a) chrome ore
(b) zirconia
(c) magnesia
(d) alumina, and
(e) mixtures of magnesia and chrome ore;
and from about 1 to 15% by weight, of a water-insoluble, finely divided, high-purity $Cr_2O_3$ of at least about 97%, by weight, $Cr_2O_3$ content on an oxide basis, substantially all of the discrete particles of said high-purity $Cr_2O_3$ being of substantially uniform size and averaging less than about 1 micron in diameter, said refractory aggregate being size graded from about —3 mesh to fines.

11. A formed refractory shape, made from a refractory, brickmaking, size graded, substantially nonplastic, refractory metal oxide aggregate and from about 1–15%, by weight, of a water-insoluble, finely divided, high-purity $Cr_2O_3$ substantially all the discrete particles of which are substantially uniform in size and averaging less than about 1 micron in diameter.

References Cited by the Examiner

UNITED STATES PATENTS

| | | | |
|---|---|---|---|
| 1,879,589 | 9/32 | Tama | 106—66 |
| 2,270,607 | 1/42 | Ryschkewitsch | 106—66 |
| 2,685,528 | 8/54 | Robinson | 106—66 |
| 2,748,007 | 5/56 | Badger et al. | 106—66 |
| 3,058,834 | 10/62 | Koehegyi | 106—59 |

FOREIGN PATENTS

| | | |
|---|---|---|
| 604,461 | 8/60 | Canada. |
| 839,326 | 6/60 | Great Britain. |

TOBIAS E. LEVOW, *Primary Examiner.*